(12) United States Patent
Lin et al.

(10) Patent No.: US 8,063,599 B2
(45) Date of Patent: Nov. 22, 2011

(54) MOTOR CONTROL DEVICE

(75) Inventors: Yung-Ping Lin, Taoyuan Hsien (TW);
Yong-Yuan Yang, Taoyuan Hsien (TW);
Bao-Qi Shi, Taoyuan Hsien (TW)

(73) Assignee: Delta Electronics, Inc., Taoyuan Hsien (TW)

( * ) Notice: Subject to any disclaimer, the term of this patent is extended or adjusted under 35 U.S.C. 154(b) by 657 days.

(21) Appl. No.: 12/190,397

(22) Filed: Aug. 12, 2008

(65) Prior Publication Data

US 2009/0060478 A1 Mar. 5, 2009

(30) Foreign Application Priority Data

Aug. 31, 2007 (TW) .............................. 96132414 A

(51) Int. Cl.
*H02P 6/18* (2006.01)

(52) U.S. Cl. .................... 318/400.34; 318/461; 318/466

(58) Field of Classification Search .................. 388/825;
318/400.34, 461, 466, 400.14, 400.3, 369,
318/437, 400.02, 786, 434, 779, 801, 432,
318/268
See application file for complete search history.

(56) References Cited

U.S. PATENT DOCUMENTS

| 5,019,756 A * | 5/1991 | Schwarz | 318/400.21 |
| 2003/0174609 A1* | 9/2003 | Choi | 369/47.33 |

* cited by examiner

*Primary Examiner* — Karen Masih
(74) *Attorney, Agent, or Firm* — Birch, Stewart, Kolasch & Birch, LLP

(57) ABSTRACT

A motor control device includes a rotation speed control circuit, a voltage transforming circuit, a buffering circuit and a driving circuit. The rotation speed control circuit provides a rotation speed control signal. The voltage transforming circuit is electrically connected to the rotation speed control circuit and transforms the rotation speed control signal to a speed control voltage signal. The buffering circuit, electrically connected to the voltage transforming circuit, receives the speed control voltage signal and delays or buffers output of the speed control voltage signal. The driving circuit, electrically connected to the buffering circuit, receives the speed control voltage signal from the buffering circuit and generates a driving signal according to the speed control voltage signal so as to control the operation of the motor.

18 Claims, 10 Drawing Sheets

MOTOR CONTROL DEVICE

CROSS REFERENCE TO RELATED APPLICATIONS

This Non-provisional application claims priority under 35 U.S.C. §119(a) on Patent Application No(s). 096132414, filed in Taiwan, Republic of China on Aug. 31, 2007, the entire contents of which are hereby incorporated by reference.

BACKGROUND OF THE INVENTION

1. Field of the Invention

The present invention relates to a motor control device, and more particularly to a motor control device for reducing the generation of the noises and surge currents when the rotation speed control signal acutely varies.

2. Description of the Related Art

FIG. 1 shows a conventional motor control device for a motor. The conventional motor control device 1 includes rotation speed control circuit 11, voltage transforming circuit 12, and driving circuit 13. The rotation speed control circuit 11 provides and transmits a rotation speed control signal to the voltage transforming circuit 12. The voltage transforming circuit 12 transforms the rotation speed control signal to a direct current (DC) voltage signal and transmits the DC voltage signal to the driving circuit 13. When receiving the DC voltage signal, the driving circuit 13 drives the motor 2 to start so as to allow the fan 3 to rotate.

As shown in FIG. 2 and FIG. 3, when the rotation speed control signal acutely varies, some unwanted problems occur. For example, when the duty cycle of the rotation speed control signal changes from 40%, such as that indicated by A in FIG. 2, to 100%, the rotation speed of motor is also changed from a low speed to a high speed, such as that shown by B in FIG. 2, it causes some issues. Firstly, the acute change of the rotation speed causes large noises. Secondly, when the rotation speed control signal acutely varies, a surge current occurs, shown in FIG. 3, which could damage the motor. FIG. 3 shows the current variation schematic diagram when the rotation speed control signal acutely varies, wherein the maximum current is 3.88 (A). The vertical axis in FIG. 3 means the amount of current which flows through the coil in the motor.

BRIEF SUMMARY OF THE INVENTION

An objective of the present invention is to provide a motor control device capable of reducing the generation of the large noises and surge currents when the rotation speed control signal acutely varies.

An embodiment of the motor control device includes a rotation speed control circuit, a voltage transforming circuit, a buffering circuit and a driving circuit. The rotation speed control circuit provides a rotation speed control signal. The voltage transforming circuit is electrically connected to the rotation speed control circuit and transforms the rotation speed control signal to a speed control voltage signal. The buffering circuit, electrically connected to the voltage transforming circuit, receives the speed control voltage signal and delays or buffers the output of the speed control voltage signal. The driving circuit, electrically connected to the buffering circuit, receives the speed control voltage signal from the buffering circuit and generates a driving signal according to the speed control voltage signal to start the motor.

The rotation speed control circuit is a pulse width modulation circuit and the rotation speed control signal is a pulse width modulation signal. Furthermore, the voltage transforming circuit is a digital-to-analog conversion circuit for transforming the rotation speed control signal to a DC voltage signal.

An embodiment of the buffering circuit includes a first capacitor having a first terminal and a second terminal grounded, a first resistor having a first terminal and a second terminal grounded, a first diode, a first node and a second node. The second node is electrically connected to the first node, the first terminal of the first capacitor, and the first terminal of the first resistor. The first diode has a first terminal electrically connected to the first node and a second terminal electrically connected to the voltage transforming circuit.

The first diode, the first node, and the first capacitor form a charging loop. The first capacitor, the first resistor, the first node, and the second node form a discharging loop.

Another embodiment of the buffering circuit includes a second capacitor, a second resistor, a second diode, a power supply circuit and the third node. The third node is respectively electrically connected to the driving circuit and first terminals of the second capacitor, the second resistor, and the second diode. A second terminal of the second resistor is grounded. A second terminal of the second diode is electrically connected to the voltage transforming circuit. The power supply circuit is electrically connected to the second terminal of the second capacitor, wherein the power supply circuit, the second capacitor and the second resistor form a charge/discharge circuit.

The power supply circuit includes a power source, a fourth node, a third resistor having a first terminal and second terminal electrically connected to the power source, a third diode having a first terminal and second terminal grounded, a fourth resistor having a first terminal and second terminal electrically connected to the fourth node, a fifth resistor having a first terminal electrically connected to the fourth node and second terminal grounded. A fifth node electrically connected to the first terminals of the third resistor, the third diode and the fourth resistor. Furthermore, the third diode is a Zener diode.

A detailed description is given in the following embodiments with reference to the accompanying drawings.

BRIEF DESCRIPTION OF THE DRAWINGS

The present invention can be more fully understood by reading the subsequent detailed description and examples with references made to the accompanying drawings, wherein.

DETAILED DESCRIPTION OF THE INVENTION

The following description is of the best-contemplated mode of carrying out the invention. This description is made for the purpose of illustrating the general principles of the invention and should not be taken in a limiting sense. The scope of the invention is best determined by reference to the appended claims.

Figure 1:
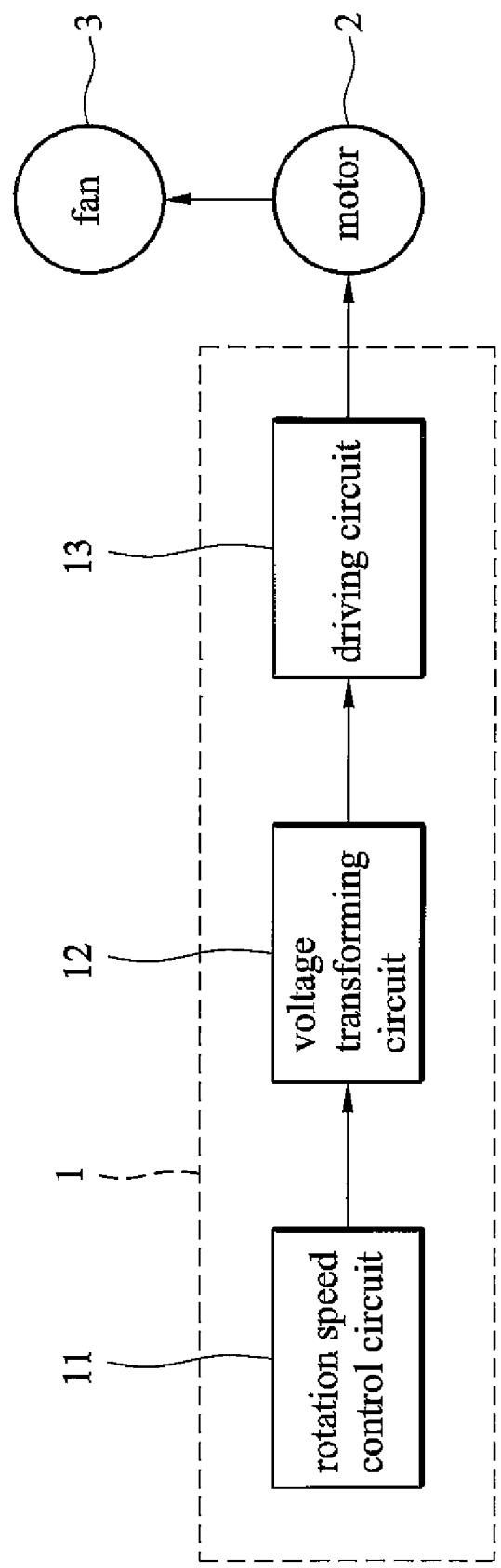
FIG. 1 is a block diagram of a conventional motor control device with the motor and fan.
Figure 2:
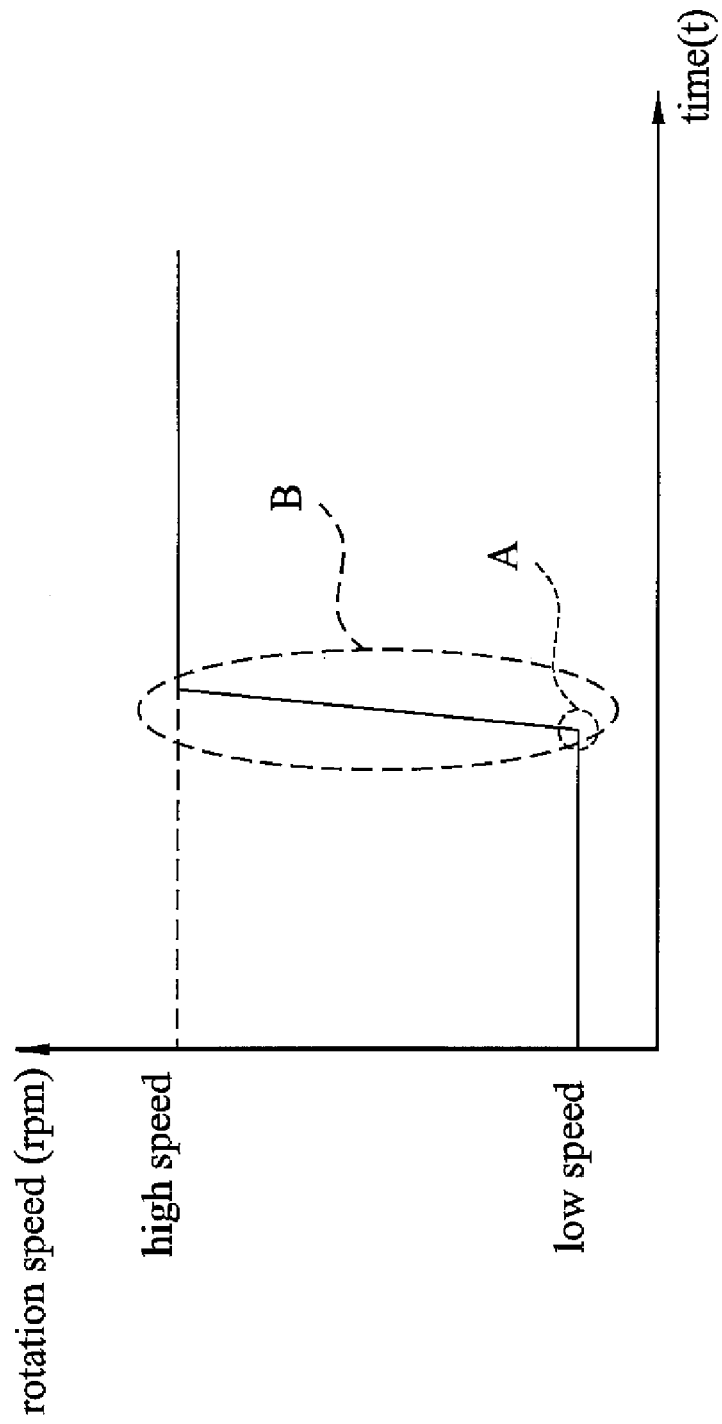
FIG. 2 shows a schematic illustration of the rotation speed variation of the conventional motor control device.
Figure 3:
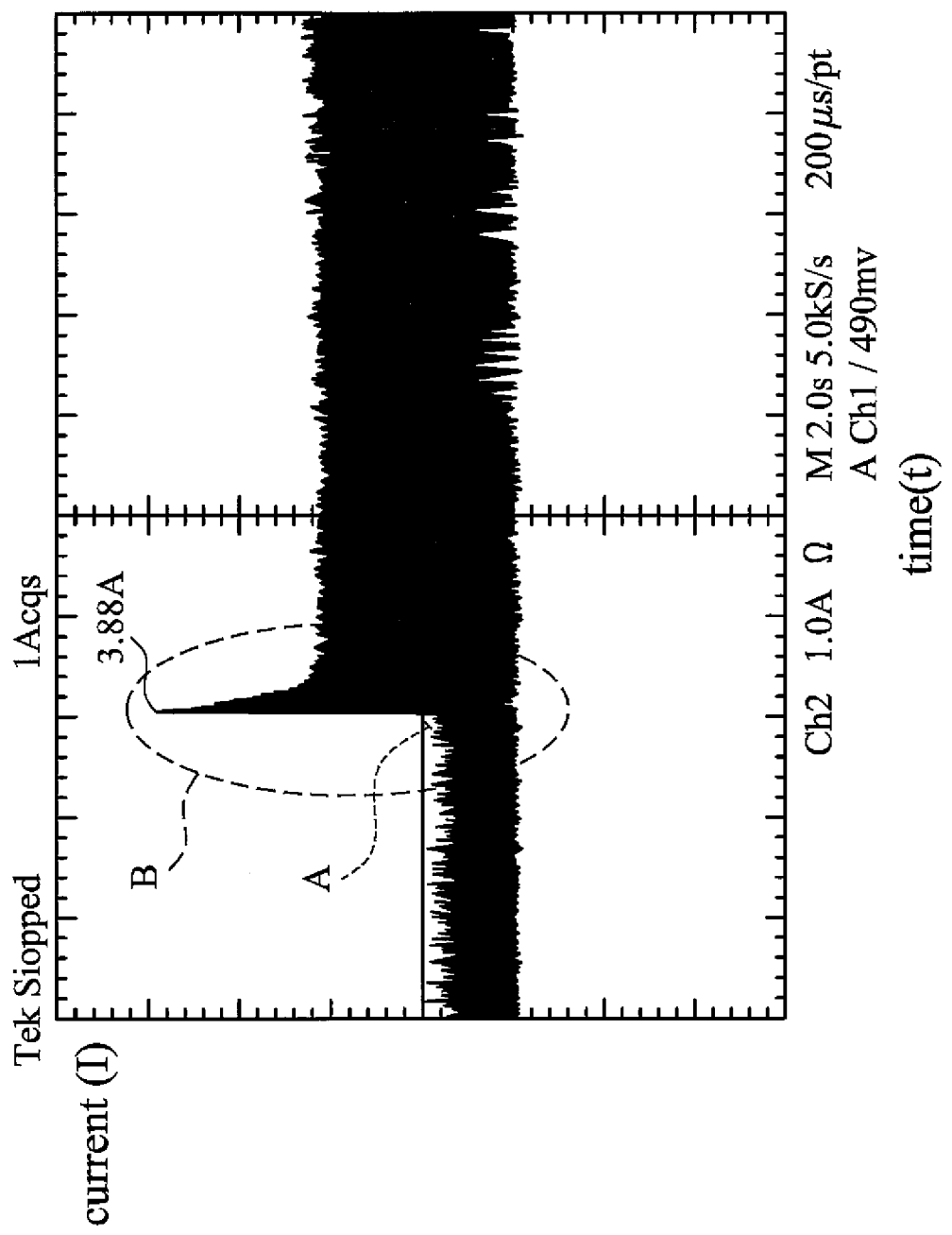
FIG. 3 shows a schematic illustration of the current variation of the conventional motor control device.
Figure 4:
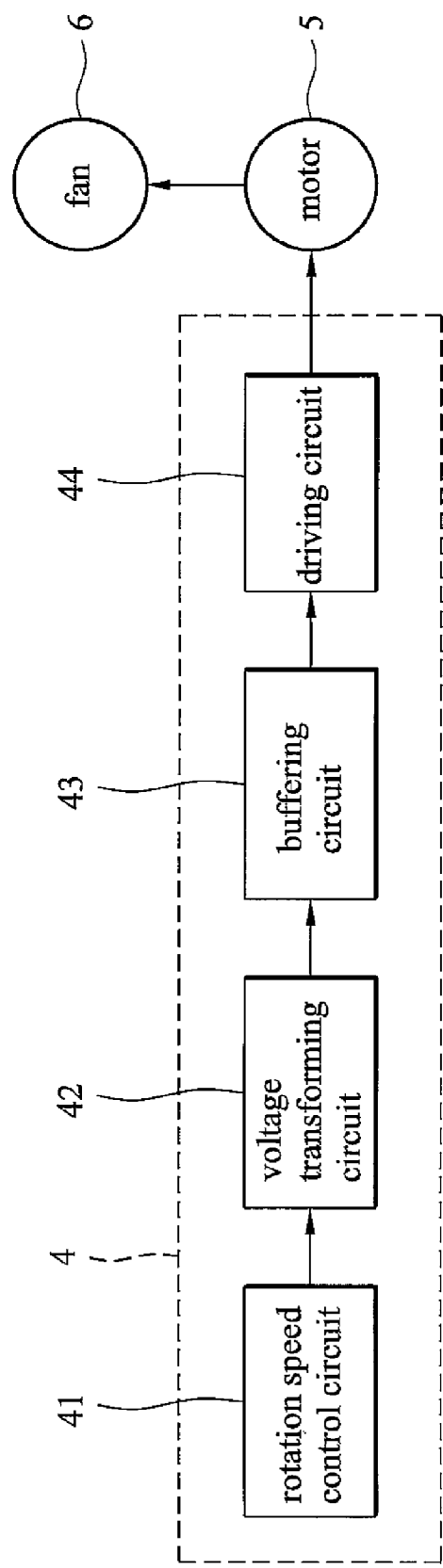
FIG. 4 is a functional block diagram of an embodiment of a motor control device with the motor and the fan according to the present invention.

FIG. 4 is a functional block diagram of an embodiment of a motor control device with the motor and the fan according to the present invention. The motor control device 4 is electrically connected to motor 5 and the motor 5 is electrically connected to a fan 6. When the motor control device 4 drives the motor 5 to start, then the fan 6 rotates. The motor control device 4 includes a rotation speed control circuit 41, a voltage transforming circuit 42, a buffering circuit 43 and a driving circuit 44. For example, the rotation speed control circuit is a pulse width modulation (PWM) circuit, the voltage transforming circuit is a digital-to-analog conversion circuit, and the driving circuit is a driving integrated circuit (IC).

The rotation speed control circuit 41 provides a rotation speed control signal. In this embodiment, the rotation speed control circuit 41 is a PWM generating circuit, and the rotation speed control signal is a PWM signal for controlling the rotation speed of the motor 5. The rotation speed control signal can be divided into a plurality of normalized distributed square waves which are generated by a pulse width modulation mechanism. Furthermore, according to the equivalent principle, the amplitude of the rotation speed control signal is equivalent to smaller amplitude. Therefore, when the equivalent rotation speed control signal is input to the driving circuit 44, the rotation speed of the motor 5 is directly reduced.

The voltage transforming circuit 42 is electrically connected to the rotation speed control circuit 41. In this embodiment, the voltage transforming circuit 42 is a digital-to-analog conversion circuit. The voltage transforming circuit 42 receives and converts the rotation speed control signal (digital signal) to a rotation control voltage signal having an analog DC voltage signal, and the voltage transforming circuit 42 outputs the rotation control voltage signal to the buffering circuit 43.

Figure 5:
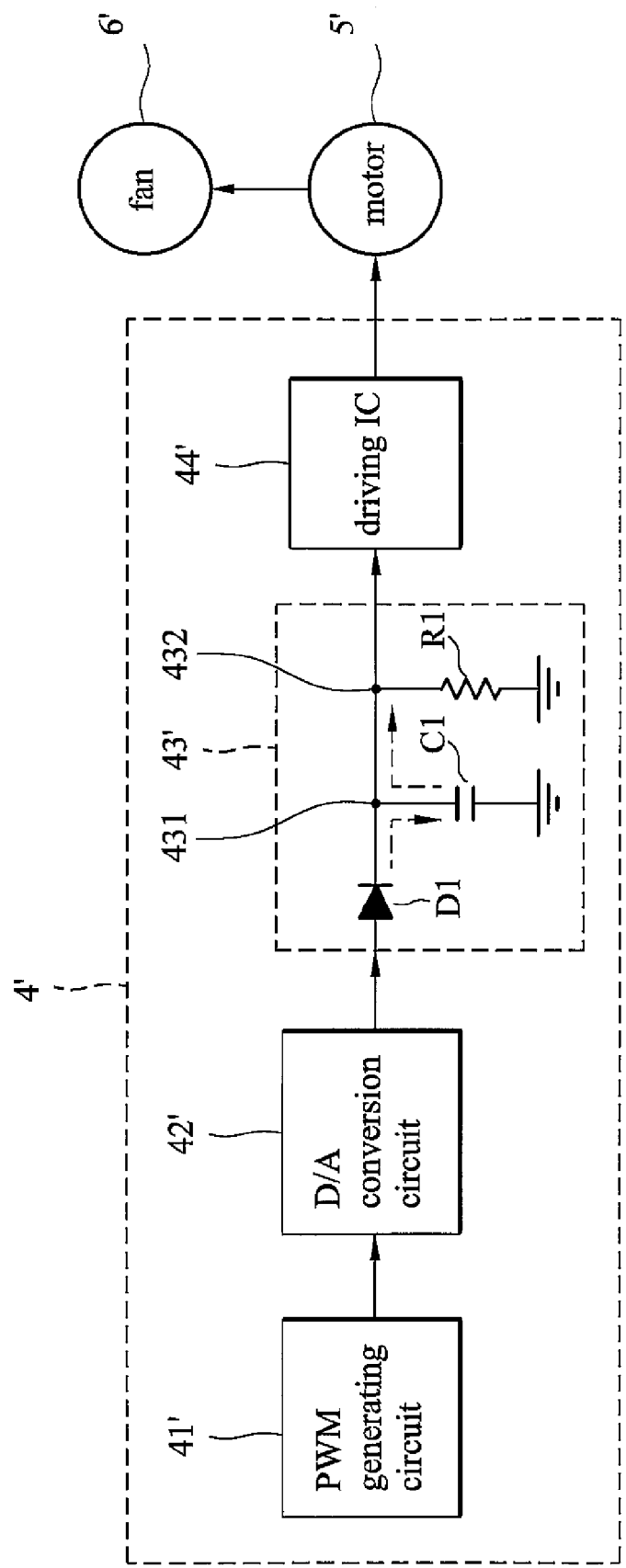
FIG. 5 is a circuit diagram of the first embodiment of the motor control device according to the present invention.

The buffering circuit 43 is electrically connected to the voltage transforming circuit 42 and receives and buffers the rotation control voltage signal. FIG. 5 is a schematic illustration of an embodiment of the motor control device with detailed circuit diagram of the buffering circuit. The buffering circuit 43' includes a first node 431, a second node 432, a first capacitor C1, a first resistor R1 and a first diode D11. The first node 431 and the second node 432 are electrically connected to the first terminal of the first capacitor C1 and the first resistor R1. The second terminals of the first capacitor C1 and the first resistor R1 are grounded. The first node 431 is electrically connected to the second node 432 and the second node 432 is electrically to the driving IC 44'. The cathode of the first diode D1 is electrically connected to the first node 431 and the anode of the first diode is electrically connected to the digital to analog conversion circuit 42'. In another embodiment, the first node 431 and the second node 432 are the same one.

Figure 6:
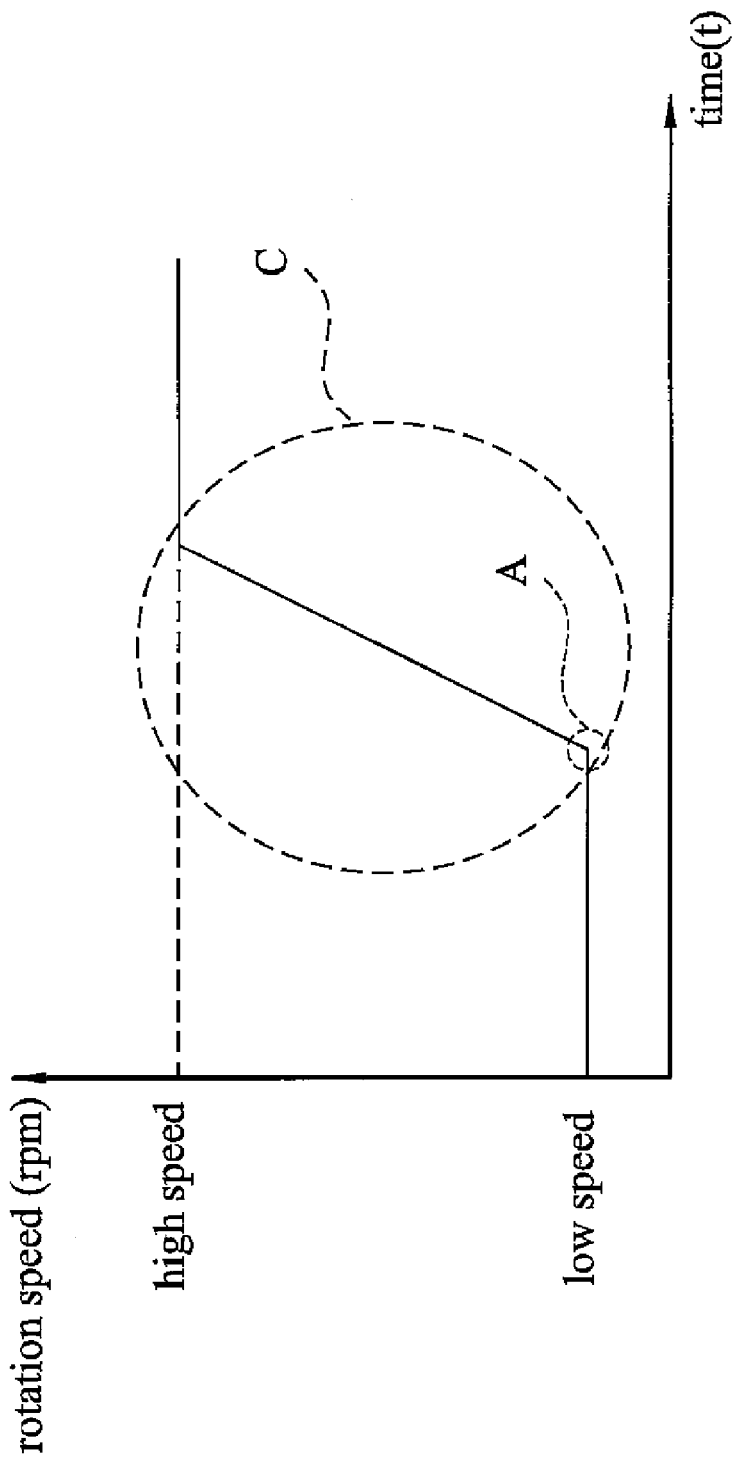
FIG. 6 shows a schematic illustration of the rotation speed variation of the motor control device according to the first embodiment of the present invention.
Figure 7:
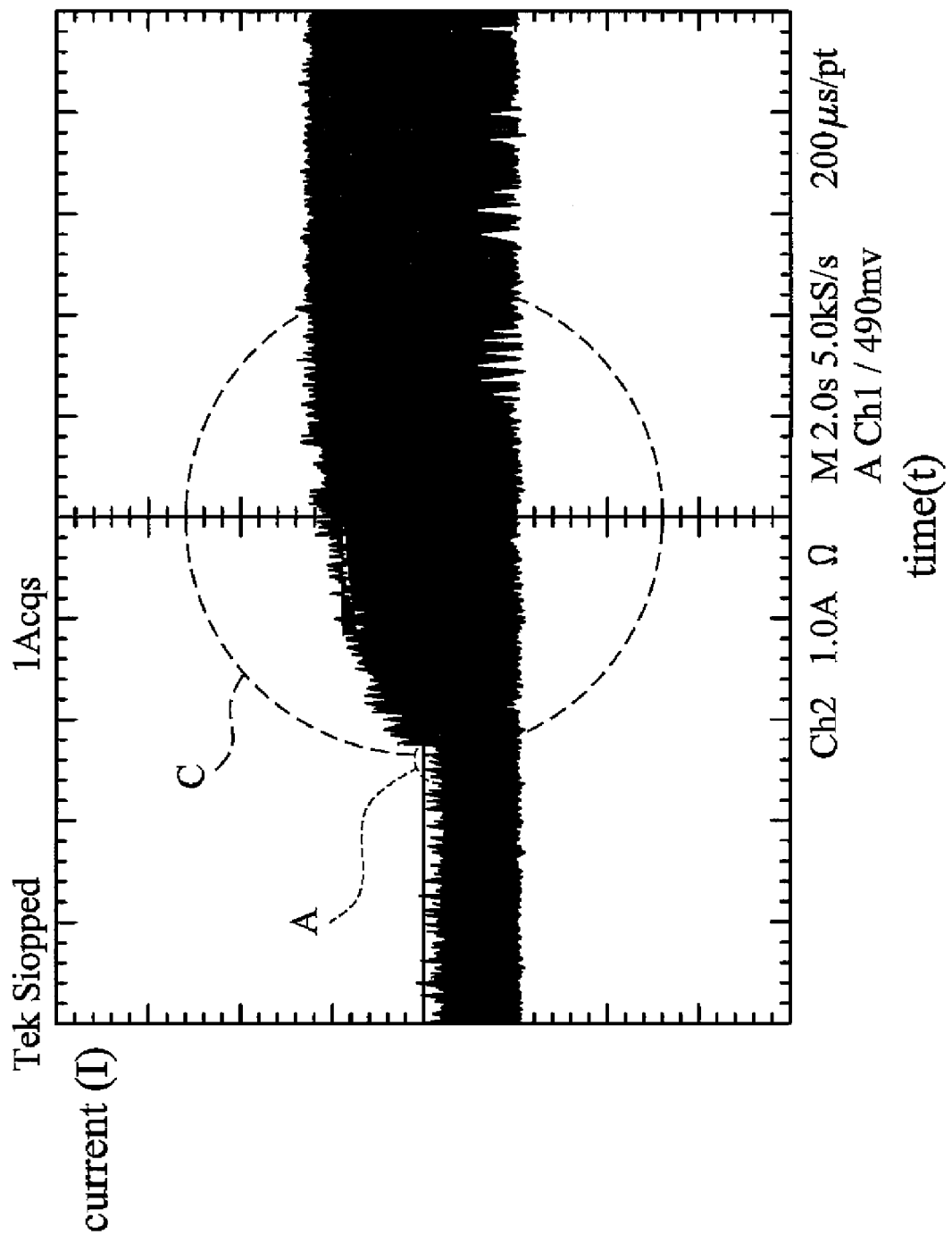
FIG. 7 shows a schematic illustration of the current variation of the motor control device according to the first embodiment of the present invention.

Furthermore, the current passes through the first diode D1 only in one direction. The operation of the first diode D1 is turned on when forward biased and the operation of the first diode D1 is turned off when reverse biased. The forward bias indicates that the voltage level of the anode of the first diode D1 is higher than the voltage level of the cathode of the first diode D1, and the reverse bias indicates that the voltage level of the anode of the first diode D1 is lower than the voltage level of the cathode of the first diode D1. The first capacitor stores the electrical energy. When the motor 5' operates at a low speed, the rotation control voltage signal input to the buffering circuit 43' is a high voltage level signal and charges the first capacitor C1 and the rotation control voltage signal is then transmitted to the driving circuit 44'. In addition, the first diode is turned on. Referring to FIG. 6, when the rotation speed control signal is changed from a low speed, indicated by A in FIG. 6, to a high speed, indicated by C in FIG. 6, the rotation control voltage signal output by the digital to analog conversion circuit 42' changes from a high voltage level to a low voltage level. Since the voltage level of the first node 431, i.e. the voltage of the first capacitor C1, is higher than the voltage level of the rotation control voltage signal, the first diode D1 is cut off and the electrical energy of the first capacitor C1 is discharged via the first resistor R1. The voltage level of the second node 432, i.e. the voltage level of the first node 431 or the output voltage level of the buffering circuit 43', slowly decreases and the current which flows through the coil in the motor increases smoothly, as shown in portion C in FIG. 7, wherein the maximum current is only 2.32 (A). The smooth switch can reduce large noises and acute current variation. In this embodiment, the first diode D1, the first node 431 and the first capacitor C1 form a charge loop. The first capacitor C1, the first resistor R1, the first node 431 and the second node 432 form a discharge loop.

Figure 8:
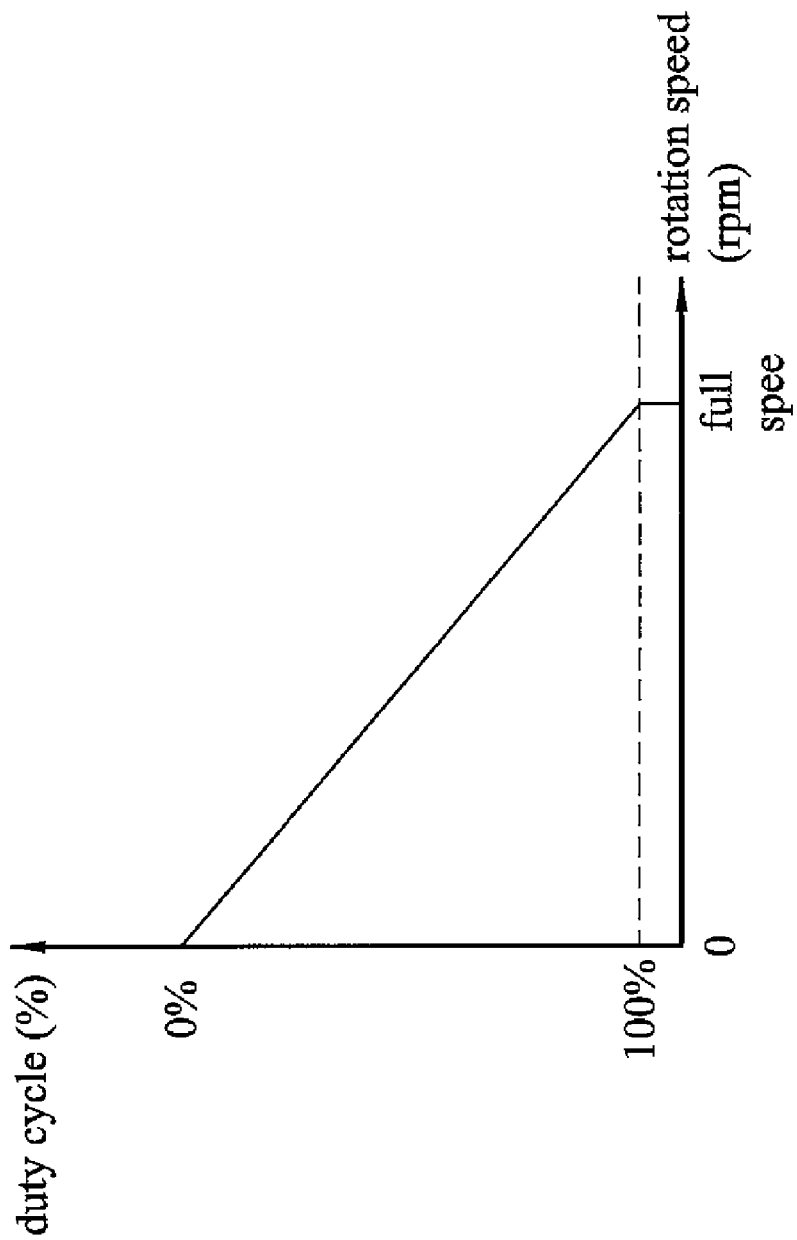
FIG. 8 shows the relation curve between the duty cycle and the rotation speed.
Figure 9:
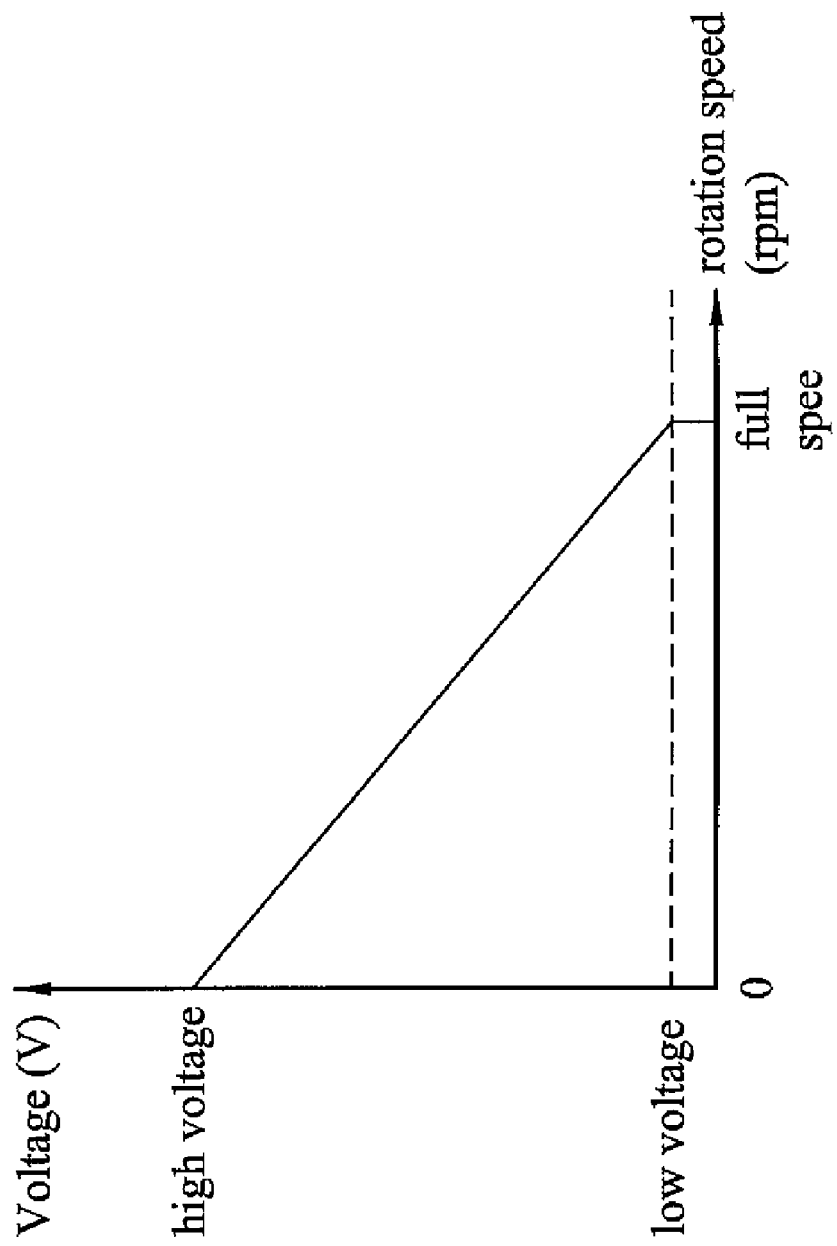
FIG. 9 shows the relation curve between the voltage and the rotation speed.

In this embodiment, the relation between the rotation speed control signal, the rotation control voltage signal and the rotation speed, is determined by the driving circuit 44 as shown in FIGS. 8 and 9. In FIG. 8, the duty cycle of the rotation speed control signal is directly proportional to the rotation speed of the motor 5 which is set by the driving circuit 44. In other words, when the duty cycle decreases, the rotation speed of the motor 5 decreases, and when the duty cycle increases, the rotation speed of the motor 5 increases. In FIG. 9, the rotation control voltage signal is inversely proportional to the rotation speed of motor 5 which is set by the driving circuit 44. In other words, when the voltage level of the rotation control voltage signal decreases, the rotation speed of the motor 5 increases, and when the voltage level of the rotation control voltage signal increases, the rotation speed of the motor 5 decreases.

The driving circuit 44 is electrically connected to the buffering circuit 43 and the motor 5. In this embodiment, the driving circuit 44 is a driving integrated circuit (IC). When the driving circuit 44 receives the rotation control voltage signal, the driving circuit 44 determines the voltage level of the received rotation control voltage signal and outputs a corresponding driving signal to drive the motor 5.

Figure 10:
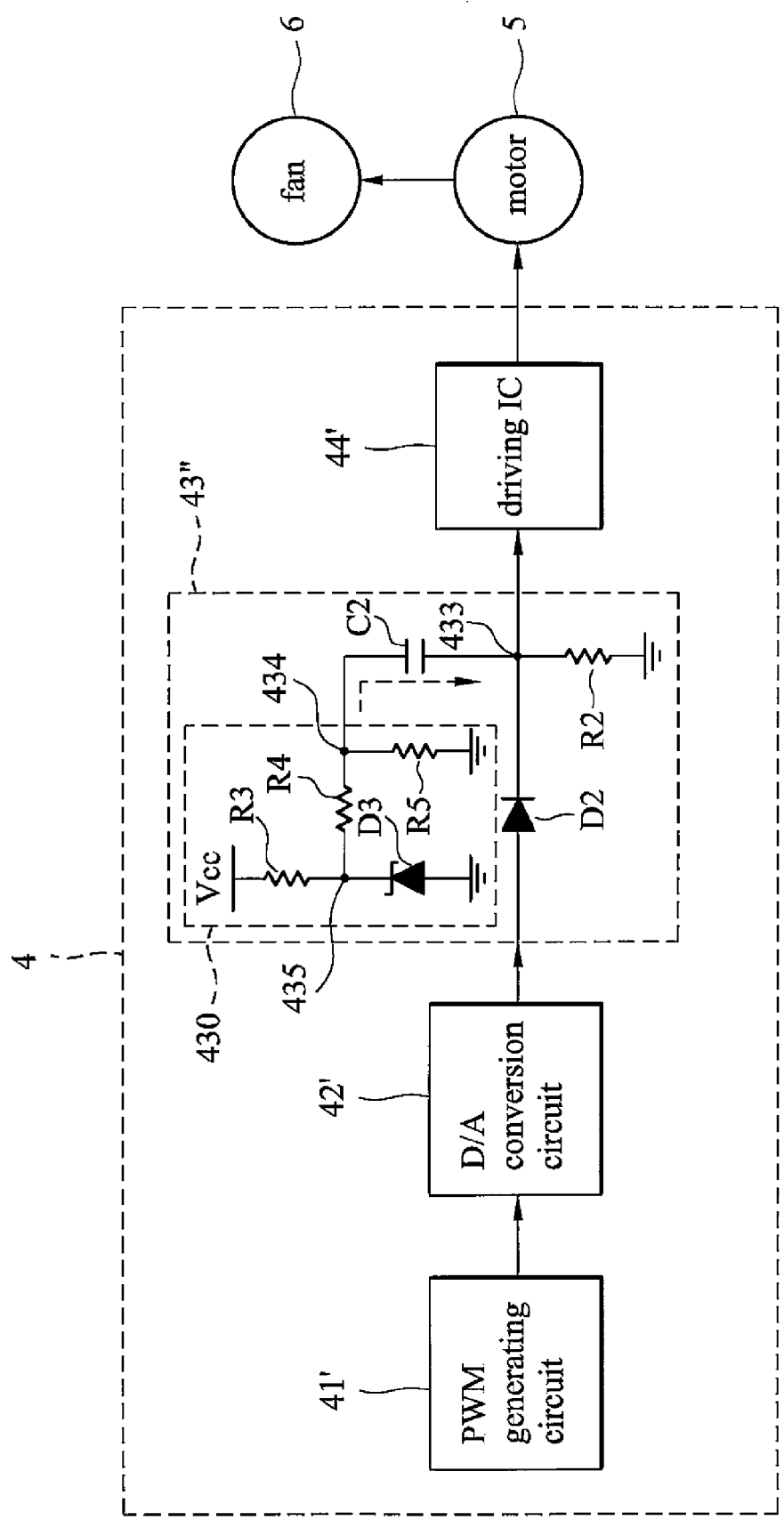
FIG. 10 is a circuit diagram of the second embodiment of the motor control device according to the present invention.

Please refer to FIG. 10. FIG. 10 is a schematic illustration of the buffering circuit according to another embodiment of the present invention. The buffering circuit 43, includes a second capacitor C2 having a first terminal and a second terminal, and a second resistor R2 having a first terminal and a second terminal, a second diode D2 having a first terminal and a second terminal, a power supply circuit 430 and a third node 433. The third node 433 is respectively electrically connected to the driving IC 44' and first terminals of the second capacitor C2, the second resistor R2, and the second diode D2. The second terminal of the second resistor R2 is grounded. The second terminal of the second diode D2 is electrically connected to the digital to analog circuit 42'. The power supply circuit 430 is electrically connected to the second terminal of the second capacitor C2, wherein the power supply circuit 430, the second capacitor C2 and the second resistor R2 form a charge/discharge circuit.

The power supply circuit 430 includes a power source Vcc, a fourth node 434, a fifth node 435, a third resistor R3, a third diode D3, a fourth resistor R4, and a fifth resistor R5. The fourth node 434 is electrically connected to the second terminal of the second capacitor C2. The third resistor R3 has a first terminal and second terminal electrically connected to the power Vcc. The third diode D3 has a first terminal and second terminal grounded. The fourth resistor R4 has a first terminal and second terminal connected to the fourth node 434. The fifth resistor R5 has a first terminal connected to the fourth node 434 and second terminal grounded. The fifth node 435 is electrically connected to the first terminals of the third resistor R3, the third diode D3 and the fourth resistor R4. Furthermore, the third diode D3 is a Zener diode.

Furthermore, the current passes through the second diode D2 only in one direction. The operation of the second diode D2 is turned on when forward biased and turned off when reverse biased. The forward bias indicates that the voltage level of the anode of the second diode D2 is higher than the voltage level of the cathode of the second diode D2, and the reverse bias indicates that the voltage level of the anode of the second diode D2 is lower than the voltage level of the cathode of the second diode D2. The third resistor R3 and the second diode D2 provide a base voltage level via the power source Vcc to provide a divided voltage to the second capacitor C2 and the second resistor R2, wherein the divided voltage is generated by the fourth resistor R4 and the fifth resistor R5. The second capacitor C2 stores the divided voltage. When the rotation speed of the motor 5 changes from a low speed to a high speed, the second diode D2 is cut off and the electrical energy of the second capacitor C2 is discharged via the second resistor R2. The voltage level of the third node 433, i.e. the output voltage level of the buffering circuit 43", smoothly decreases and the current which flows through the coil in the motor also smoothly increases.

The motor control device 4 of the present invention mainly provides a buffering circuit 43 for smoothly outputting the rotation control voltage signal from the voltage transforming circuit 42 when the rotation speed of the motor 5 varies acutely. This mechanism avoids the generation of the noises and surge current when the rotation speed of the motor 5 changes from a low speed to a high speed.

While the invention has been described by way of example and in terms of the preferred embodiments, it is to be understood that the invention is not limited to the disclosed embodiments. To the contrary, it is intended to cover various modifications and similar arrangements (as would be apparent to those skilled in the art). Therefore, the scope of the appended claims should be accorded the broadest interpretation so as to encompass all such modifications and similar arrangements.

What is claimed is:

1. A motor control device connected to a motor, the motor control device comprising:
a rotation speed control circuit to provide a rotation speed control signal;
a voltage transforming circuit electrically connected to the rotation speed control circuit, to transform the rotation speed control signal to a speed control voltage signal;
a buffering circuit electrically connected to the voltage transforming circuit, to receive the speed control voltage signal and to delay or to buffer output of the speed control voltage signal; and
a driving circuit electrically connected to the buffering circuit, to receive the speed control voltage signal from the buffering circuit and to generate a driving signal according to the speed control voltage signal to start the motor,
wherein the buffering circuit further comprises:
a first capacitor having a first terminal and a second terminal grounded;
a first resistor having a first terminal and a second terminal grounded;
a first node; and
a second node electrically connected to the first node, the first terminal of the first capacitor, and the first terminal of the first resistor.

2. The motor control device as claimed in claim 1, wherein the rotation speed control circuit is a pulse width modulation circuit and the rotation speed control signal is a pulse width modulation signal.

3. The motor control device as claimed in claim 1, wherein the rotation speed control signal comprises a plurality of normalized distributed square waves which are generated by a pulse width modulation mechanism.

4. The motor control device as claimed in claim 1, wherein the voltage transforming circuit is a digital-to-analog conversion circuit for transforming the rotation speed control signal to a direct current voltage signal.

5. The motor control device as claimed in claim 1, wherein the driving circuit is a driver integrated circuit.

6. The motor control device as claimed in claim 1, wherein the first node and the second node are the same.

7. The motor control device as claimed in claim 1, wherein the first capacitor, the first resistor, the first node and the second node form a discharging loop.

8. The motor control device as claimed in claim 1, wherein the second node is electrically connected to the driving circuit.

9. The motor control device as claimed in claim 1, wherein the buffering circuit further comprises a first diode having a first terminal electrically connected to the first node and a second terminal electrically connected to the voltage transforming circuit.

10. The motor control device as claimed in claim 1, wherein the first diode, the first node and the first capacitor form a charging loop.

11. A motor control device connected to a motor, the motor control device comprising:
a rotation speed control circuit to provide a rotation speed control signal;
a voltage transforming circuit electrically connected to the rotation speed control circuit, to transform the rotation speed control signal to a speed control voltage signal;
a buffering circuit electrically connected to the voltage transforming circuit, to receive the speed control voltage signal and to delay or to buffer output of the speed control voltage signal; and
a driving circuit electrically connected to the buffering circuit, to receive the speed control voltage signal from the buffering circuit and to generate a driving signal according to the speed control voltage signal to start the motor, wherein the buffering circuit comprises:
a third node;
a second capacitor having a first terminal electrically connected to the third node and a second terminal; and
a second resistor having a first terminal electrically connected to the third node and a second terminal grounded.

12. The motor control device as claimed in claim 11, wherein the third node is electrically connected to the driving circuit.

13. The motor control device as claimed in claim 11, wherein the buffering circuit further comprises a second diode having a first terminal electrically connected to the third node and a second terminal electrically connected to the voltage transforming circuit.

14. The motor control device as claimed in claim 11, wherein the buffering circuit further comprises a power supply circuit electrically connected to the second terminal of the second capacitor.

15. The motor control device as claimed in claim 14, wherein the power supply circuit, the second capacitor and the second resistor constitute a charging circuit and a discharging circuit.

16. The motor control device as claimed in claim 14, wherein the power supply circuit comprises:
a power source;
a fourth node;
a third resistor having a first terminal and second terminal electrically connected to the power;
a third diode having a first terminal and second terminal grounded;
a fourth resistor having a first terminal and second terminal electrically connected to the fourth node;
a fifth resistor having a first terminal electrically connected to the fourth node and second terminal grounded; and
a fifth node electrically connected to the first terminals of the third resistor, the third diode and the fourth resistor.

17. The motor control device as claimed in claim 16, wherein the fourth node is electrically connected to the second terminal of the second capacitor.

18. The motor control device as claimed in claim 16, wherein the third diode is a Zener diode.

* * * * *